US005627644A

United States Patent [19]
Sanders

[11] Patent Number: 5,627,644
[45] Date of Patent: May 6, 1997

[54] KERR EFFECT COMPENSATION BY OPTICAL POWER BALANCING IN INTERFEROMETRIC FIBER OPTIC GYROSCOPES

[76] Inventor: Glen A. Sanders, 13359 N. 101 Pl., Scottsdale, Ariz. 85260

[21] Appl. No.: 473,053

[22] Filed: Jun. 7, 1995

[51] Int. Cl.$^6$ .................................................. G01C 19/64
[52] U.S. Cl. ................................................... 356/350
[58] Field of Search .............................................. 356/350

[56] References Cited

U.S. PATENT DOCUMENTS

| | | | |
|---|---|---|---|
| 4,673,293 | 6/1987 | Sanders | 356/350 |
| 4,773,759 | 9/1988 | Bergh et al. | 356/350 |
| 5,018,859 | 5/1991 | Chang et al. | 356/350 |
| 5,098,188 | 3/1992 | Melvern | 356/350 |
| 5,111,326 | 5/1992 | Ball | 359/244 |
| 5,351,252 | 9/1994 | Toyama et al. | 356/350 X |

OTHER PUBLICATIONS

G. Sanders, "Critical review of resonator fiber optic gyroscope technology," *Fiber Optic Sensors* vol. CR44 SPIE Optical Engineering Press Proceedings of the Conference of SPIE, Boston, Mass. (Sep. 8–11, 1992), pp. 133–159.

*Primary Examiner*—Vincent P. McGraw
*Attorney, Agent, or Firm*—John G. Shudy, Jr.

[57] ABSTRACT

An interferometric fiber optic gyroscope having an intensity servo electronics feedback loop that monitors the intensity of the counterpropagating beams relative to each other, and provides a signal to a modulator to intensity modulate at least one of the signals so as to equalize the intensities or power of the beams to virtually eliminate the Kerr effect.

6 Claims, 3 Drawing Sheets

KERR EFFECT COMPENSATION BY OPTICAL POWER BALANCING IN INTERFEROMETRIC FIBER OPTIC GYROSCOPES

BACKGROUND OF THE INVENTION

The present invention concerns fiber optic systems having Kerr effect reduction schemes and, more particularly, arrangements for accommodating Kerr effect reduction by equalization of the power levels of electromagnetic waves counterpropagating in an optical fiber sensing loop.

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

A fiber optic gyroscope has a coiled optical fiber wound on a core and about the axis thereof around which rotation is to be sensed. The optical fiber is typical of a length of 100 to 2,000 meters, or so, and is part of a closed optical path in which an electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposed direction, and so a large phase difference can be obtained in the long optical fiber but in the relatively small volume taken by it as a result of being coiled.

The output current from the photodetector system photodiode, in response to the opposite direction traveling electromagnetic waves impinging thereon after passing through the coiled optical fiber, follows a raised cosine function. That is, the output current depends on the cosine of the phase difference between these two waves. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of the coiled optical fiber. In order to achieve sensitive detection of rotation, the Sagnac interferometer is typically biased by a sinusoidal modulation of the differential phase between the counter-propagating beams within the interferometric loop. As a result, one of these opposite direction propagating waves passes through the modulator on the way into the coil while the other wave, traversing the coil in the opposite direction, passes through the modulator upon exiting the coil.

In addition, a phase-sensitive detector serving as part of a demodulator system is provided to receive a signal representing the photodetector output current. Both the phase modulator and the phase-sensitive detector can be operated by a sinusoidal signal generator at the so-called "proper" frequency to reduce or eliminate modulator induced amplitude modulation, but other waveform types of the same fundamental frequency can be used. Other frequencies can be used, and often are, to reduce the frequency to a more manageable value.

The resulting signal output of the phase-sensitive detector follows a sine function, i.e., the output signal depends on the sine of the phase difference between the two electromagnetic waves impinging on the photodiode, primarily the phase shift due to rotation about the axis of the coil in the absence of occurrence of other significant but unwanted phase shifts. A sine function is an odd function having its maximum rate of change at zero phase shift, and so changes algebraic sine on either side of zero phase shift. Hence, the phase-sensitive detector signal can provide an indication of which direction a rotation is occurring about the axis of the coil, and can provide the maximum rate of change of signal value as a function of the rotation rate near a zero rotation rate, i.e. the detector has its maximum sensitivity for phase shifts near zero so that its output signal is quite sensitive to low rotation rates. This is possible, of course, only if phase shifts due to other sources, that is, errors, are sufficiently small. In addition, this output signal in these circumstances is very close to being linear at relatively low rotation rates. Such characteristics for the output signal of the phase-sensitive detector are a substantial improvement over the characteristics of the output current of the photodetector without optical phase modulation.

Figure 1:
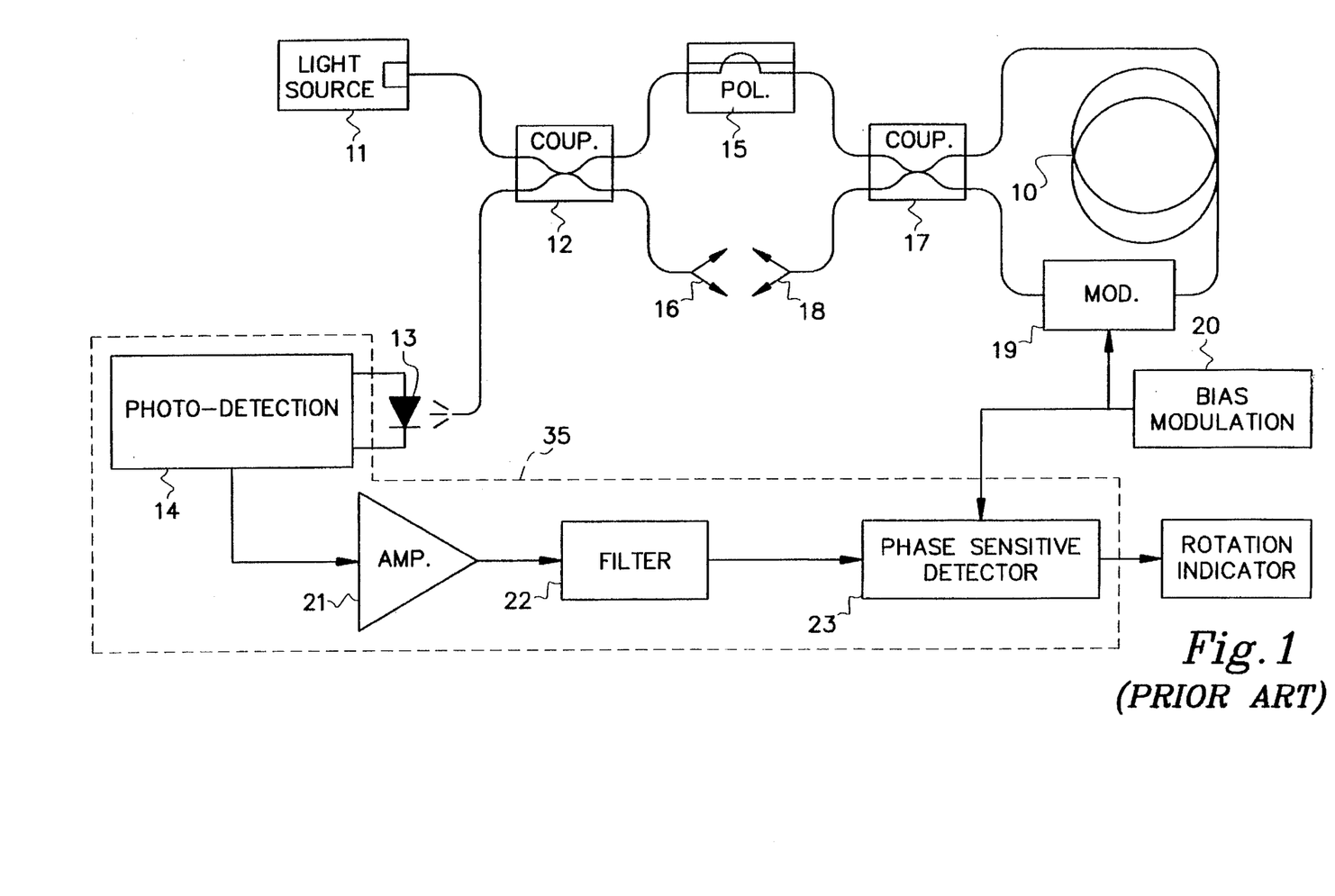
FIG. 1 is an open loop interferometric fiber optic gyroscope of the related art.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves which propagate in opposite directions through coil 10 are provided from an electromagnetic wave source, or light source 11, in FIG. 1. This source is typically a semiconductor light source such as a laser diode which provides electromagnetic waves, typically in the near-infrared part of the spectrum, with a typical wavelengths of 830 nanometers (nm) to 1550 nm. Source 11 must have a short coherence length for emitted light to reduce the phase shift difference errors between these waves due to Rayleigh and Fresnel scattering at scattering sites in coil 10. Because of the nonlinear Kerr effect in coil 10, different intensities in the two counter propagating waves can lead to different phase shifts therebetween. This situation can be overcome also by use of a short coherence length source for source 11 that emits light with suitable statistical properties.

Between laser diode 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against laser diode 11 at a point of optimum light emission therefrom, a point from which it extends to a first optical directional coupler 12.

Optical directional coupler 12 has light transmission media therein which extend between four ports, two on each end of that media, and which are shown on each end of coupler 12 in FIG. 1. One of these ports has the optical fiber extending from laser diode 11 positioned thereagainst. At the other port on the sense end of the optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned thereagainst and provides a photo current in response to a signal component selection means 35. This photocurrent, as indicated above, in the case of two nearly coherent light waves impinging thereon, follows a cosine function in providing a photocurrent output which depends on the cosine of the phase difference between such a pair of substantially coherent light waves. This photovoltaic device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization such that clockwise (cw) and counterclockwise (ccw) waves of the same polarization are introduced into the sensing loop and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bidirectional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 19 by a bias modulation signal generator 20 providing a sinusoidal voltage output signal at a modulation frequency $f_g$ that is intended to be equal to $C_1 \sin(\omega_g t)$ where $\omega_g$ is the radian frequency equivalent of the modulation frequency $f_g$. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent $i_{PD13}$ proportional to the intensity of the two electromagnetic waves or light waves impinging thereon, and is therefore expected to follow the cosine of the phase difference between these two waves impinging on that diode as given by the following equation:

$$i_{PD13} = I_o/2[1+\cos{(\phi_R + \omega_m \cos{\omega_g t})}]$$

This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi R$ between the waves. Further, there is an additional variable phase shift introduced in this photodiode output current by modulator 19 with an amplitude value of $\phi_m$ and which is intended to vary as $\cos(\omega_g t)$.

Optical phase modulator 19 is of the kind described above and is used in conjunction with a phase-sensitive detector as part of a demodulation system for converting the output signal of photodetection system 14, following a cosine function as indicated above, to a signal following a sine function. Following such a sine function provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed through a filter 22, to such a phase sensitive detector means 23. Photodetection system 14, amplifier 21, filter 22 and phase sensitive detector 23 constitute signal component selection means. Phase-sensitive detector 23, serving as part of a phase demodulation system, is a well known device. Such a phase-sensitive detector extracts the amplitude of the first harmonic of the filtered photodiode system output signal, or the fundamental frequency of modulation signal generator 20, to provide an indication of the relative phase of the electromagnetic waves impinging on photodiode 13. This information is provided by phase-sensitive detector 23 in an output signal following a sine function, that is, this output signal follows the sine of the phase difference between the two electromagnetic waves impinging on photodiode 13.

Bias modulator signal generator 20, in modulating the light in the optical path at the frequency $f_g$ described above, also leads to harmonic components being generated by the recombined electromagnetic waves in photodetection system 14. Filter 22 is a bandpass filter which is to pass the modulation frequency component of the output signal of photodetector 14, i.e., the first harmonic, after its amplification by amplifier 21.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves.

The amplitude scaling factor of the modulation frequency component of the output signal of photodetection system 14, appearing at the output of filter 22, is expected to be set by the sine of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing phase-sensitive detector 23 leaving a demodulator system (detector) output signal depending on just the amplitude scaling factor thereof.

Thus, the voltage at the output of amplifier 21 will typically appear as:

$$V_{21-out} = k\{1+\cos{[\phi_R + \phi_m \cos{(\omega_g t + \theta)}]}\}$$

The constant k represents the gains through the system to the output of amplifier 21. The symbol $\theta$ represents additional phase delay in the output signal of amplifier 21 with respect to the phase of the signal provided by generator 20. Some of this phase shift will be introduced in photodetection system 14, and some will be due from other sources such as a phase shift across modulator 19 between the phase of the signals supplied by generator 20 and the response of modulator 19 in having the index of refraction of the media therein, and/or its length, correspondingly change. The other symbols used in the preceding equation have the same meaning as they did in the first equation above.

The foregoing equation can be expanded in a Bessel series expansion to give the following:

$$V_{21-out} = k[1 + J_0(\psi_m)\cos\psi_R] - 2kJ_1(\psi_m)\sin\psi_R \cos(\omega_g t + \theta) -$$

$$2kJ_2(\psi_m)\cos\psi_R \cos2(\omega_g t + \theta) + 2kJ_3(\psi_m)\sin\psi_R \cos3(\omega_g t + \theta) +$$

$$\sum_{n=2}^{\infty} [(-1)^n 2kJ_{2n}(\psi_m)\cos\psi_R \cos2n(\omega t + \theta) +$$

$$(-1)^n 2kJ_{2n+1}(\psi_m)\sin\psi_R \cos(2n+1)(\omega_g t + \theta)]$$

This signal at the output of amplifier 21 is applied to the input of filter 22.

Filter 22, as indicated above, passes primarily the first harmonic from the last equation, i.e., the modulation frequency component. As a result, the output signal of filter 22 can be written as follows:

$$V_{22-out} = -2kJ_1(\phi_m) \sin \phi_R \cos{(\omega_g t + \theta + \psi_1)}$$

The further phase delay term appearing $\psi_1$ is the additional phase shift in the first harmonic term added as a result of passing through filter 22. This added phase shift is expected to be substantially constant and a known characteristic of filter 22.

The signal from filter 22 is then applied to phase-sensitive detector 23, as is the signal from bias modulator generator 20, the latter again intended to be equal to $C_1 \sin(\omega_g t)$ where $\omega_g$ is the radian frequency equivalent of the modulation frequency $f_g$. Assuming that a phase shift equal to $\theta + \psi_1$ can be added by phase-sensitive detector 23 to its reference signal, the output of that detector with such a generator 20 output signal will then be the following:

$$V_{23-out} = k'J_1(\phi_m) \sin \phi_R$$

The constant k' accounts for the system gains through phase-sensitive detector 23.

As can be seen from this equation, the output of phase sensitive detector 23 depends on the amplitude $\phi_m$ supplied by bias modulator 19 as operated by bias modulation generator 20 can be used to set the value of the signal at the output of phase-sensitive detector 23 for a given rotation rate of coil 10 about its axis, i.e., set the scale factor for the gyroscope at least within a range of possible values therefor.

However, these expected results may not be achieved in the system of FIG. 1. One reason for failing to achieve the expected results is that bias modulation signal generator 20, in modulating the light in the optical path at frequency $f_g$ as described above through phase modulator 19, not only results in harmonic components being generated in photodetection system 14 by the recombined electromagnetic waves, but also directly supplies some harmonic components in the varying optical path phase because of nonlinearities occurring both in generator 20 and modulator 19.

That is, as a first possibility, the output signal supplied by modulation generator 20 at its output may contain not only a fundamental signal at frequency $f_g$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic sign on either side of zero. Hence, the phase sensitive demodulator signal can provide both an indication of which direction a rotation is occurring about the axis of the coil, and can provide the maximum rate of change of signal value as a function of rotation rate near a zero rotation rate, i.e. has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator are a substantial improvement over the characteristics of the output current of the photodetector.

Nevertheless, the phase sensitive demodulator output, in following a sine function, results in an output that at rotation rates further from zero, is less and less linear. For rotation rates of an amplitude sufficient to be past one of the peaks of the sine function, the output response value because of being periodic will be ambiguous with respect to just which rotation rate is occurring. Thus, there is a strong desire to operate the gyroscope so that the output signal of the phase sensitive demodulator stays within the linear region near the zero rotation rate value.

This can be accomplished by adding a further phase modulator, or frequency shifter, near the coil in an optical path portion used by the opposite direction traveling electromagnetic waves propagating through the coiled optical fiber to reach the photodetector. This phase modulator, or frequency shifter, is operated in a feedback loop from the photodetector system, and provides sufficient negative feedback such that the phase modulator introduced phase change is just enough to cancel the phase shift difference between the opposite traveling direction electromagnetic waves resulting from a rotation about the axis of the coiled optical fiber. As a result, there will be little phase shift difference occurring at the photodetector except for transient rotation rate changes, and so little phase shift sensed by the phase sensitive demodulator. Thus, the output signal of this phase sensitive demodulator will always be near to, or at, zero. The signal from a generator connected to the phase sensitive demodulator for operating this additional phase modulator, through providing a signal directing the modulator to provide a particular phase shift sufficient to cancel the phase shift due to rotation, will thus contain within it or a related signal the information as to the magnitude and direction of the rotation rate.

Several forms for the output signal from the generator connected to the phase sensitive demodulator in the feedback loop have been suggested for operating this additional optical phase modulator. One common and good choice is to use a serrodyne generator which applies a sawtooth-like signal to the optical phase modulator. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave the modulator with its frequency translated by an amount equal to the frequency of the sawtooth signal. A non-ideal sawtooth signal won't result in pure frequency translation, there instead will be added harmonics generated which can be kept small by providing very nearly a sawtooth waveform and by good design of the modulator.

Since the optical phase modulator so operated will be on one side of the coiled optical fiber, one of the electromagnetic waves will have its frequency translated upon entering the coil while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at the photodetector in an amount set by the frequency of the sawtooth and the nature of the fiber of $2\pi\tau\Delta f$. Here, $\Delta f$ is the modulator or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

Figure 2:
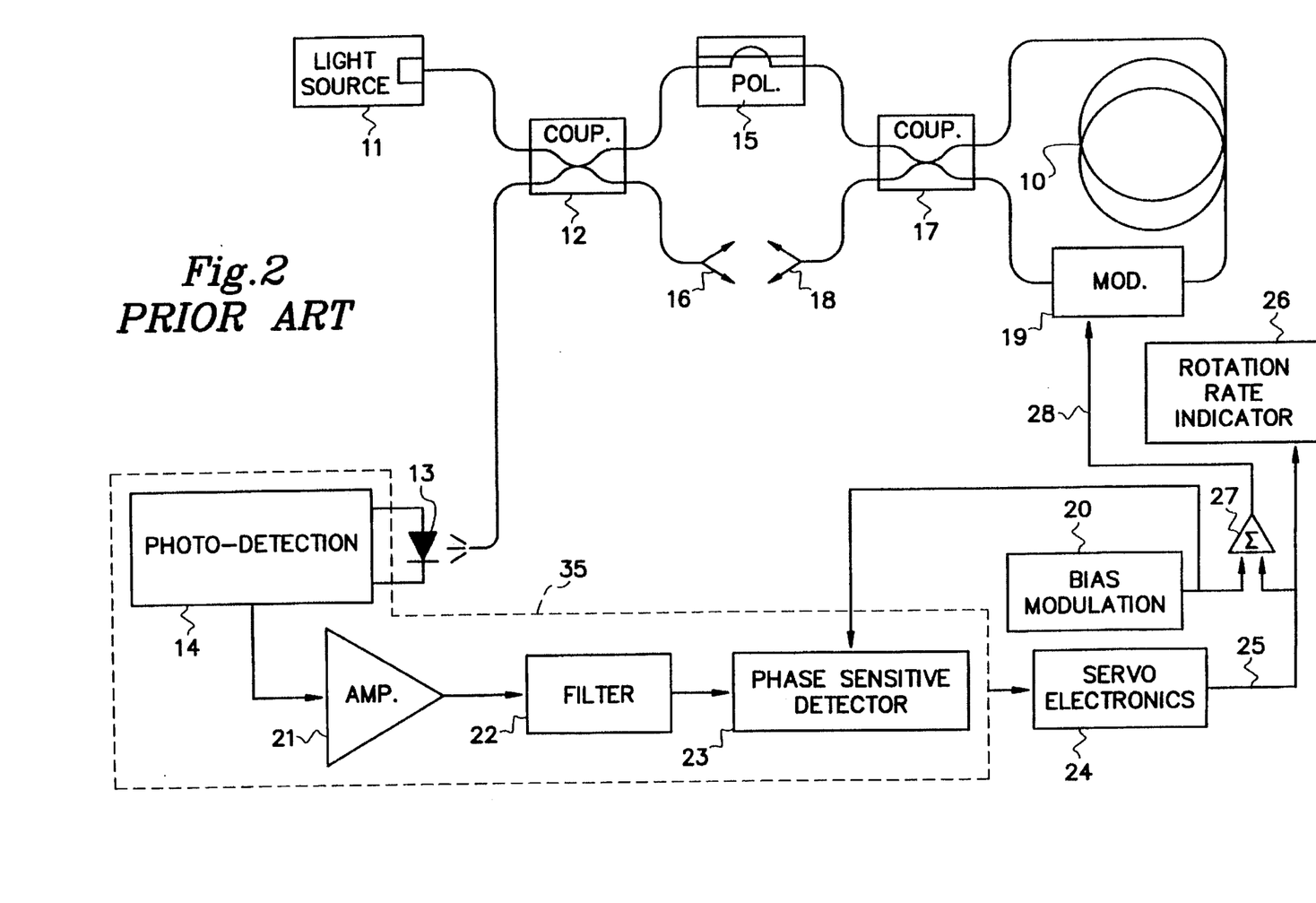
FIG. 2 is a closed loop interferometer fiber optic gyroscope of the related art.

This is shown in FIG. 2. Rather than to the rotation rate indicator of FIG. 1, the signal from phase sensitive detector 23 goes to servo electronics 24 which is incorporated in FIG. 2. This signal indicates the magnitude and sign of the phase difference between beams. In response to such phase difference, servo electronics 24 outputs a phase ramp signal 25 that goes to summing amplifier 27 that supplies the phase ramp to modulator 19 in the form of signal 28 to phase-shift one beam relative to the other beam so as to bring the beams in phase with each other. Summing amplifier 27 also supplies in signal 28 the bias modulation signal to this phase modulator. The feedback signal required to return beams into phase, such as the frequency of the sawtooth in the serrodyne modulation case, is an indication of the rate of rotation of sensing loop. In this closed loop case the modulator of choice is typically a phase modulator on an integrated optic chip (IOC) in order to accommodate the necessary high frequency content of the desired phase ramp signal which may be a sawtooth or a dual-ramp-type triangular wave. The signal 25, indicative of rotation, is then supplied to a rotation rate indicator 26 which provides a convenient and readily useful indication of rotation rate of loop.

SUMMARY OF THE INVENTION

The invention is a solution to the problem of unequal intensities of counterpropagating beams in the sensing loop of a fiber optic gyroscope, which cause a Kerr effect thet leads to erroneous rotation rate indications. Equal intensities of these counterpropagating beams virtually eliminate the root cause of the Kerr effect error in the fiber optic gyroscope. The invention incorporates an intensity servo electronics feedback loop that monitors the intensities of the counterpropagating beams relative to each other, and provides a signal to intensity modulate at least one of the signals so as to equalize the beams to virtually eliminate the Kerr effect.

DESCRIPTION OF THE EMBODIMENT

Figure 3:
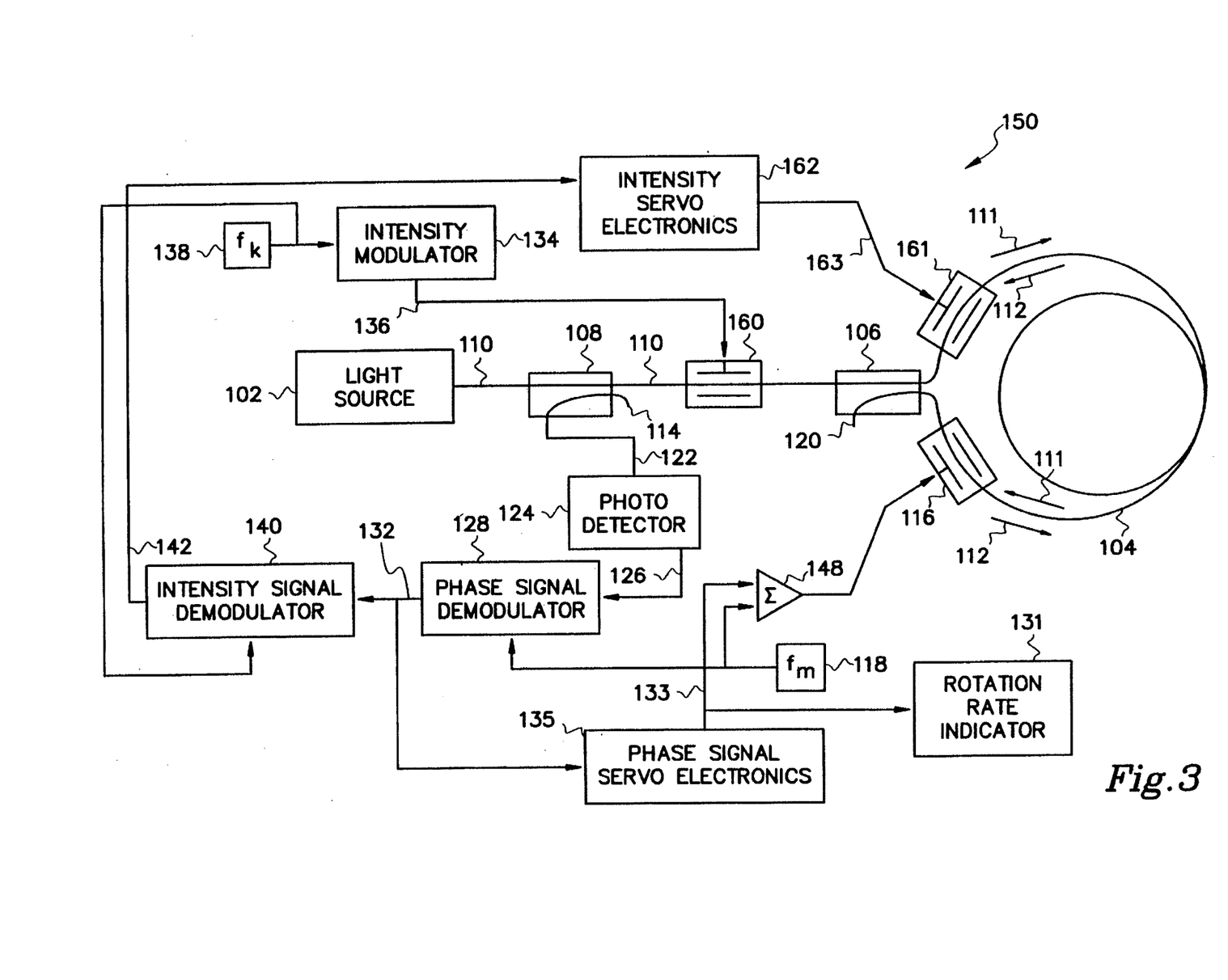
FIG. 3 is an embodiment of the invention in a fiber optic gyroscope.

FIG. 3 reveals an interferometric fiber optic gyroscope 150 incorporating the invention for effecting compensation of optical Kerr effect in sensing loop 104. Light source 102 emits light 110 on through splitter 108 into integrated optic intensity modulator 160 and through splitter 106. Light beam 110 is split into two beams 111 and 112 by splitter 106. Splitter 106 is optically connected through integrated optic intensity modulator 161 and integrated optic phase modulator 116 to the end of an optical fiber coil that constitutes sensing loop 104. Beam 111 propagates clockwise through loop 104 and beam 112 propagates counterclockwise through loop 104.

Phase modulator 116 provides a bias phase modulation to beam 112 as it enters loop 104 and to beam 111 as it exits loop 104. The bias modulation signal originates, via a summing amplifier 148, from oscillator 118 that puts out the signal at a frequency $f_m$.

Beams 111 and 112 have intensities that affect the index of refraction of the optical path in loop 104. If the intensities of counterpropagating beams 111 and 112 are different, then the lengths of their respective optical paths are different, because of the differing indices of refraction, thereby resulting in a relative phase shift between beams 111 and 112 upon their return from loop 104, when loop 104 is at rest.

However, the differing path lengths and relative phase shift of beams 111 and 112 indicate a rotation when interpreted in light of the Sagnac effect. This rotation error is due to the optical Kerr effect caused by the uneven intensities of beams 111 and 112. Such error may be remedied by assuring that the intensities of beams 111 and 112 are equal to each other.

Beams 111 and 112 return to splitter 106 and are combined. Beams 111 and 112 enter splitter 106 wherein a portion of the beams go through intensity modulator 160 to splitter 108 which conveys beams 111 and 112 to photodetector 124 which converts the light beams into electrical signals 126. If beams 111 and 112 are in phase, they result in a constructive interference that is converted into a maximum type of electrical signal 126 which indicates no rotation of loop 104 relative to an axis of loop 104 which may be identified with a straight line perpendicular to a plane containing loop 104. If loop 104 is rotating about its axis, then a relative phase shift between beams 111 and 112 occurs thereby resulting in less constructive interference because of beams 111 and 112 being no longer in phase with each other. The corresponding signal from photodetector 124 indicates a less maximum type of signal 126 indicating a rate of rotation of loop 104 about its axis. Since beams 111 and 112 are phase modulated by modulator 116, signal 126 has the modulation signal on it and is thus demodulated by demodulator 120 in conjunction with a signal having a frequency $f_m$ from oscillator 118, to result in a signal 132 indicative of rotation. However, signal 126 and signal 132 may indicate a rate of rotation of loop 104 even when loop 104 is at rest, which is caused by the optical Kerr effect. That is, another way that optical paths of beams 111 and 112 may have different lengths is due to different indices of refraction between the optical paths. The beams travel at different speeds through a media having differing indices of refraction. Even though the same fiber is the path for both beams, the index of refraction for each beam is partially dependent on the relative power of both respective beams. If beams 111 and 112 have two different intensity levels, then the medium will in general have a different propagation constant for one wave than for the other wave. The change in the propagation constants due to the Kerr Effect in the cw and ccw directions, $\beta_{K1}$ and $\beta_{K2}$, respectively, are unequal due to unequal cw and ccw intensities $I_1(z,t)$ and $I_2(z,t)$ corresponding to beams 111 and 112, respectively, according to the following equations, $$\beta_{k1}(z,t) = \frac{4\pi\eta n_2}{\lambda} \delta[I_1(z,t) + 2I_2(z,t)] \quad (1)$$

$$\beta_{k2}(z,t) = \frac{4\pi\eta n_2}{\lambda} \delta[I_2(z,t) + 2I_1(z,t)] \quad (2)$$

where the above formulas reflect the fact that the intensities and therefore the propagation constants may vary with position around the fiber loop and in the case of source light with amplitude modulation, may vary in time. The variable z represents the position along the length of the loop, with z=0 defined by where the cw wave enters the loop at the output of coupler 106 and z=L being similarly defined where the ccw wave enters the loop of length L.

In the above equation, the wavelength of light is given by $\lambda$, the impedance of the coil medium by $\eta$, the Kerr coefficient of the coil fiber by $n_2$, and $\delta$ represents a constant factor related to the distribution of light across the fiber cross-section. As can be seen from the above formulas, if $I_1$ and $I_2$ are not equal at a given point in the loop at a given time, $\beta_{K1}$ and $\beta_{K2}$ will be different at that point in the fiber at that instant. In general, the source light may have amplitude modulation imposed upon it that will cause $I_1(t,z)$ and $I_2(t,z)$ to vary in time. Also, $I_1(t,z=0) \neq I_2(t,z=L)$, then the light waves entering the loop have unequal amplitudes, which causes differences between $\beta_{K1}$ and $\beta_{K2}$.

It should be noted that, in equation 1, that $\beta_{K1}$ is dependent on its own intensity $I_1(t, z)$ and twice as dependent on the intensity $I_2(t, z)$ of the oppositely propagating wave. That is, the dependence of $\beta_{K1}$ on the oppositely propagating wave, i.e., the cross effect, is twice as strong as the dependence on its own intensity, i.e., the self effect. This is similarly true for $\beta_{K2}$. If, instead, the two dependences were equal, then $\beta_{K1}$ would be equal to $\beta_{K2}$. Because of this relationship, an imbalance in $I_1$ and $I_2$ will in general give rise to unequal optical phase shifts around the loop. Thus, each beam will travel an optical path that has a different length than the other. In such case, beams 111 and 112 leave loop 104 out of phase with respect to each other despite the nonrotation of loop 104. If beams 111 and 112 are in phase, there is a constructive interference which results in a maximum type of light signal being presented to detector 124 which has corresponding electrical signal 126 indicating beams 111 and 112 to be in phase and, consequently, indicating the nonrotation of loop 104. However, when beams 111 and 112 have differing intensities and are out of phase, electrical signal 126 from detector 124 falsely indicates rotation of loop 104 when loop 104 is actually at rest. This false indication is an error due to an optical Kerr effect which is caused by the index of an optical medium not being completely independent of the intensity of a traversing beam in the medium. This false indication of rotation $\Omega_e$ is given by the following, $$\Omega_e = \frac{2c}{D} \eta n_2 \delta (1 - 2U) \left[ \frac{<I_o^2(t)> - 2<I_o(t)>^2}{<I_o(t)>} \right] \quad (3)$$

where D is the sensing coil diameter, $I_o(t)$ is the source intensity at the time t of being split into $I_1$ and $I_2$ and entering the sensing coil, c is the speed of light in a vacuum and U is the split ratio of the loop coupler, i.e., $I_2=UI_o$ and $I_1=(1-U)I_o$. The brackets < > indicate the time average of the enclosed quantity, which may in general be time dependent. For the case of a monochromatic source with constant intensity $<I_o^2(t)>=<I_o(t)>^2$ making the term in brackets [ ] equal to $-<I_o>$ and providing for an error if $U\neq 0.5$. In this case, the situation employs the use of square wave modulation of the source light wave intensity $I_o$ with a 50 percent on/off duty cycle to eliminate this effect. This makes $<I_o^2(t)>=2<I_o(t)>^2$ and thus, the term in brackets [ ] in equation 3 equal to zero. This elimination of the Kerr effect for all values of U is accomplished. This is accomplished by essentially halving the size of the cross effect in equations 1 and 2 since the two optical waves only overlap half the time, whereas the self effect is always present. In this implementation, the modulation frequency $f_m$ must be above the inverse of the coil transit time $\tau$, and is typically a factor of ten above $1/\tau$ to achieve most of the benefit of this error reduction technique. In general, different light sources have different relationships between $<I_o^2(t)>$ and $<I_o(t)>^2$. Broadband sources such as superluminescent diodes were originally pursued for interferometric fiber optic gyroscope applications as a means of eliminating drift due to light backscatter in the sensing loop and due to the propagation of light in the unwanted second state of polarization in the sensing loop. In the case of broadband sources, the relationship of $<I_o^2(t)>$ to $2<I_o(t)>^2$ depends on how the source is energized and in general will be different than the case of a monochromatic source of constant amplitude. These differences are due to intensity fluctuations resulting from the instantaneous beating of independent oscillators that comprise a broad spectral source. Thus, depending on the specific broadband source and method of excitation, the Kerr effect will be different for a gyro using a broadband source. A solution is to assure that the Kerr effect is zero by making the intensity levels of beams 111 and 112 effectively equal to each other. For this purpose, it is possible to simplify equation (3) by representing $\Omega_e$ as $$\Omega_e = k_1(1 - 2U)<I_o(t)> = k_1(1 - 2U)I_o(t) \quad (4)$$

where $$k_1 = \frac{2c}{D} \eta n_2 \delta \left[ \frac{<I_o^2(t)> - 2<I_o(t)>^2}{<I_o(t)>^2} \right] \quad (5)$$

and where the < > in equation (4) was dropped and from here on $I_o(t)$ refers to only the average value of $I_o(t)$. However the average value of $I_o(t)$ is considered here to vary slowly, but in a timeframe much longer than $\tau$. Thus, the < > in equations 3 and 5 were intended average over times substantially longer than $\tau$. Output signal 126 from photodetector/preamp combination 124 is then given by $$V_{126} = k\{1 + \cos[\phi_R + \phi_e + \phi_m\cos(\omega_g t + \Theta)]\} \quad (6)$$

where $$\phi_e = \Omega_e \left( \frac{2\pi LD}{\lambda c} \right) \quad (7)$$

where L is sensing loop length and D is the diameter of the sensing loop, and k is a constant that includes the source intensity $I_o$, the photodetector gain, and the losses of the optical circuit.

Demodulator 128 receives signal 126 and demodulates that signal with with respect to a reference signal from oscillator or phase modulator 118 at frequency $f_m$. An output signal 132 of demodulator 128

$$V_{132} = k'J_1(\phi_m) \sin (\phi_R + \phi_e) \quad (8)$$

goes to phase signal servo electronics 135, where k' is a constant that includes k and the demodulator gain.

In order to achieve the required output linearity at rotation rates further from zero, i.e., use the linear portion of the sine function in equation 8, the gyro is operated in a closed loop manner. Signal 132 is used to represent the servo error signal being indicative of a phase difference between waves 111 and 112. Upon acceptance of signal 132 phase signal servo electronics 135 generates a voltage ramp of sawtooth type in accordance with serrodyne modulation that is summed in the bias modulation in amplifier 148. The output signal 133 containing the voltage ramp is then supplied to the integrated optical phase modulator 116 that produces a sawtooth phase ramp in the sensing loop. This phase ramp produces another optical phase difference $\phi_f$ between waves 111 and 112 in order to restore $V_{132}$ to its null condition. The phase ramp signal 133 will contain within it the information related to the magnitude and direction of rotation rate. Signal 133 is therefore suppiled to rotation rate indicator 131 to extract the rotation information and output the result. Under closed loop operation, the new form of signal 132 is given by $$V'_{132} = k'J_1(\phi_m) \sin (\phi_R + \phi_e + \phi_f)$$

where $\phi_R$, $\phi_e$, and $\phi_f$ are optical phase differences due to rotation, the Kerr effect, and the applied phase ramp, respectively.

Fiber optic gyroscope 150 has a mechanism for eliminating optical Kerr effect and the resulting rotational error resulting from the effect. That mechanism equalizes or balances the intensities of beams 111 and 112 so that the refractive indices of the respective light paths of the beams are affected in the same way such that the propagation constants and light paths are the same for beams 111 and 112. Thus, when sensing loop 104 is at rest, beams 111 and 112 are still in phase at the time they exit loop 104, are combined by splitter 106, are split off onto fiber 122 and detected by photodetector 124 which sends signal 126 to demodulator 128. Rotation indicator 131 reveals loop 104 to be at rest, in accordance with the output from demodulator 128 via phase nulling signal servo electronics 135.

Light 110, from source 102, goes through splitter 108 into IOC modulator 160 and is intensity modulated by modulator 134 with a signal at a frequency $f_k$ from oscillator 138. Beam 110 is split into two beams 111 and 112 which, in turn, are similarly intensity modulated. Intensity modulator 160 may be a Mach-Zehnder interferometer or a cutoff modulator. Thus, the intensity of lightwave 110 may be represented as $$I_o(t) = I_{00} + I_{01} \cos \omega_k t \; (\omega_k \ll 1/\tau) \qquad (9)$$

where $\omega_k = 2\pi f_k$, $I_{00}$ is the constant part of the average intensity and $I_{01}$ is the modulation amplitude.

When loop 104 is at rest, and beams 111 and 112 have unequal intensities, the beams will be out of phase as indicated above. These beams, as to their phase relationship based on relative intensities, are identified by their modulation frequency $f_m$, so as to distinguish the phase relationship of the beams caused by a rotation of loop 104. Beams 111 and 112, combined at splitter 106 upon their return from loop 104 and split off on to fiber 122 and to be converted into electrical signal 126. Electrical signal 126 is now given by $$V_{126} = k_0(I_{00} + I_{01}\cos\omega_k t) \left\{ 1 + \cos\left[ \phi_R + \left(\frac{2\pi LD}{\lambda c}\right) k_1(1-2U)(I_{00} + I_{01}\cos\omega_k t) + \phi_f + \phi_m \cos(\omega_g t + \theta) \right] \right\} \qquad (10a)$$

Where $k_0$ is equal to the constant k divided by the source intensity the former of which includes optical losses from the source to the detector and the transfer function of the detector 124. Electrical signal 126 now goes to demodulator 128 to be demodulated with respect to frequency $f_m$ into signal 132 for purposes of deciphering the phase relationship of beams 111 and 112 for determining the rate of rotation of loop 104.

Signal 132 is still a modulated signal representing beams 111 and 112 having the phase relationship as determined by the respective intensities of beams, with respect to frequency $f_k$ now given by $$V_{132} = k'_0 J_1(\phi_m)(I_{00} + I_{01}\cos 2\pi f_k t)\sin\left\{ \phi_R + \phi_f + \left(\frac{2\pi LD}{\lambda c}\right) k_1(1-2U)(I_{00} + I_{01}\cos 2\pi f_k t) \right\} \qquad (10b)$$

Where $k'_0$ is a constant proportional to $k_0$ and the demodulator gain. Note that for the purposes of rotation sensing, the AC component of $V'_{132}$ at $f_k$ may be filtered out in the phase signal servo electronics so that the signal at $f_k$ does not affect the synthesis of the phase ramp or signal 133. In this case, $f_k$ may be chosen to facilitate or optimize this filtering process. Signal 132 may be rewritten as $$V'_{132} = -k'_0 I_{00} 2J_1(\phi_m) \sin(\phi_0 + \Delta\phi_e \cos\omega_k t) - 2k'_0 I_{01} J_1(\phi_m) \sin(\phi_0 + \Delta\phi_e \cos\omega_k t)\cos\omega_k t \qquad (11)$$

where $$\phi_0 = \phi_R + \phi_f + \phi_{eo} \qquad (12)$$

and $$\phi_{eo} = \beta(1-2U)I_{00} \qquad (13a)$$

and $$\beta = k_1 \left( \frac{2\pi LD}{\lambda c} \right) \qquad (13b)$$

and $$\Delta\phi_e = \beta(1-2U)I_{01} \qquad (14)$$

In equation 11, the DC component of the Kerr Effect error, represented by $\phi_{eo}$ is the error that the invention eliminates. The AC or modulated Kerr Effect error, represented in magnitude by $\Delta\phi_e$ is used to eliminate $\phi_{eo}$ as outlined below.

Equation 11 may be expanded into frequency components of $f_k$. The components of interest are the component at DC given by $V'_{132}(dc)$ and the component at $f_k$ given by $V'_{132}(f_k)$ as follows:

$$V'_{132}(dc) = -2k'_0 J_1(\phi_m)[I_{00} \sin\phi_0 J_0(\Delta\phi_e) + I_{01}\cos\phi_0 J_1(\Delta\phi_e)] \qquad (15)$$

and $$V'_{132}(f_k) = -2J_1(\phi_m)k'_0 \cos\omega_k t[2I_{00}J_1(\Delta\phi_e)\cos\phi_0 + I_{01}\sin\phi_0(J_0(\Delta\phi_e) + J_2(\Delta\phi_e))] \qquad (16)$$

where $J_0$, $J_1$ and $J_2$ are Bessel functions.

$V'_{132}(dc)$ is critical for the generation of the phase ramp on signal 133 and determining rotation rate. Signal components of $V'_{132}$ at $nf_k$ where $n \geq 2$ are of no interest and are filtered out. The signal component of $V'_{132}$ at $f_k$ given by $V'_{132}(f_k)$ is used to eliminate Kerr error.

Signal 132 is demodulated with respect to a reference signal indicative of the intensity modulation of beams 111 and 112 at frequency $f_k$ from oscillator or modulator driver 138. Signal 142 from demodulator 140 is proportional to the strength of the bias due to Kerr effect in the sensing loop, i.e., proportional to the difference in optical intensities of waves 111 and 112. Signal 142 is given by $$V_{142} = -2J_1(\phi_m)k'_0 k_2[2I_{00}J_1(\Delta\phi_e)\cos\phi_0 + I_{01}\sin\phi_0(J_0(\Delta\phi_e) + J_2(\Delta\phi_e))] \qquad (17)$$

where $k_2$ represents the gain of demodulator 140 and $\Delta\phi_e$ and $\phi_0$ contain information about the difference between optical wave intensities.

Signal 142 goes to servo electronics 162 which outputs a signal 163 that goes to an intensity modulator 161. Signal 163 operates modulator 161 to intensity modulate beam 111 so as to affect the intensity level of beam 111 until it matches the intensity level of beam 112. When the intensity levels of beams 111 and 112 are equal, the difference phase relationship between beams 111 and 112 due to the optical Kerr effect is zero. Such phase relationship information with respect to modulation frequency $f_k$ is in signals 126, 132 and 142. Consequently, signal 142 instructs servo electronics 162 to output a signal not to further affect the intensity of beam 111 until an optical Kerr effect indication occurs again. This servo operation can be seen by noting that the phase ramp rotation servo causes $V'_{132}(DC) = 0$ and the optical power balancing servo causes $V_{142} = 0$. These two conditions can be rewritten from equations 15 and 17 to give, $$I_{00} \sin\phi_0 = -I_{01}\Delta\phi_e \cos\phi_0 \qquad (18)$$

and $$\Delta\phi_e 2I_{oo} \cos\phi_0 = -I_{o1} \sin\phi_0 \quad (19)$$

where it has been assumed, that because $\Delta\phi_e \ll \pi$, that $J_0(\Delta\phi_e) \cong 1$, $J_1(\Delta\phi_e) \cong \Delta\phi_e$, $J_2(\Delta\phi_e) \cong 0$.

The simultaneous solutions for equations 18 and 19 are $$\phi_0 = 0 = \phi_R + \phi_f + \phi_{eo} = \phi_R + \phi_f + \beta(1-2U)I_{oo} \quad (20)$$

and $$\Delta\phi_e = 0 = \beta(1-2U)I_{o1} \quad (21)$$

From equation 21 it is obvious that the optical power balancing servo sets $U=0.5$ and therefore, in equation 20, $\phi_{eo}=0$ and $\phi_f=-\phi_R$. Thus, the DC component $\phi_{eo}$ of the Kerr effect and the modulated component are set to zero by making $U=0.5$.

Therefore, beams 111 and 112 have equal intensities and face the same indices of refraction in their respective optical light paths, resulting in no optical Kerr effect, and a phase ramp indicative of the true rotation rate.

It should be noted that the Kerr effect due to unequal light intensities in the IOC modulators 116 and 161 located inside the sensing loop, have been neglected in equations 1 through 21. This is a good approximation (and a helpful simplification) since the IOC modulator length typically constitutes less than $10^{-4}$ of the total loop length and would only very slightly change the exact magnitude of Kerr effect. Since the intent of the invention is to null the Kerr effect by setting the intensity of one wave equal to that of the other, the invention would still accomplish this result. In fact, in the case where there are unequal losses in the loop due to the integrated optics, the invention will null the total Kerr effect, thus adjusting the effective average intensities of two waves in the clockwise and counter-clockwise directions. In this general case U is interpreted as the effective power split ratio between beams 111 and 112. The servo loops acts to null the total Kerr effect, thus effectively equalizing the two counterpropagating intensities.

It must be noted that the optical circuit of FIG. 3 consisting of intensity modulator 160, splitter 106, phase modulator 116 and intensity modulator 161 may all be placed on one single integrated optics chip, with the splitter 106 replaced by a Y-junction.

I claim:

1. An interferometric fiber optic gyroscope comprising:
   a light source;
   a splitter proximate to said light source;
   a fiber optic sensing loop connected to said splitter;
   a detector connected to said splitter;
   a phase modulator proximate to said splitter;
   a phase bias modulation frequency source connected to said phase modulator;
   a phase signal demodulator connected to said detector and to said bias modulation frequency source;
   a first intensity modulator proximate to said splitter;
   an intensity modulation frequency source connected to said first intensity modulator;
   an intensity signal demodulator connected to said phase signal demodulator, and to said intensity modulation frequency source; and
   a second intensity modulator proximate to said splitter and connected to said intensity signal demodulator.

2. The gyroscope of claim 1 wherein:
   said light source emits a first beam of light;
   the first beam is intensity modulated by said first intensity modulator at a first frequency from said intensity modulation frequency source;
   said splitter receives and splits the first light beam into second and third beams of light;
   the second beam is phase modulated by said phase modulator at a second frequency from said phase bias modulation frequency source;
   the second and third beams counter-rotate in said fiber optic sensing loop;
   said splitter combines the second and third beams upon exiting said fiber optic sensing loop;
   said detector receives the second and third beams, after counter-rotating in said fiber optic sensing loop, and outputs a first electrical signal representing second and third beams to said phase signal demodulator;
   the first electrical signal is demodulated with respect to the second frequency by said phase signal demodulator into a second electrical signal that indicates an amount of phase difference between the second and third beams, the phase difference being caused by rotation of said fiber optic sensing loop;
   said intensity signal demodulator receives the second electrical signal and demodulates the second electrical signal with respect to the first frequency into a third electrical signal indicating an intensity difference between the second and third beams; and
   an optical power balancing servo electronics for receiving and processing the third electrical signal into a fourth electrical signal which goes to said second intensity modulator to modulate the second beam entering said fiber optic sensing loop so as to cause the intensity difference between the second and third beams to approach zero.

3. The gyroscope of claim 2 further comprising phase nulling signal servo electronics connected to said phase signal demodulator and to said phase modulator.

4. The gyroscope of claim 3 wherein:
   said phase nulling signal servo electronics receives and processes the second electrical signal into a fifth electrical signal that goes to said phase modulator to modulate the third beam entering said fiber optic sensing loop so as to cause the phase difference between the second and third beams to approach zero, the fifth electrical signal having a magnitude that is required to cause the phase difference to approach zero, and the magnitude of the fifth electrical signal being an indication of an amount of rotation rate of said fiber optic sensing loop.

5. An interferometric fiber optic gyroscope comprising:
   light source means for emitting a first light beam;
   splitting means, proximate to said light source means, for splitting a first light beam into second and third light beams;
   optical fiber sensing loop means, connected to said splitting means, wherein the second light beam propagates through said optical fiber sensing loop means in a first direction and the third light beam propagates in said optical fiber sensing loop means in a second direction, such that the second and third beams counter-rotate in said optical fiber sensing loop means;
   first modulation means, connected to said optical fiber sensing loop means, for phase modulating the third light beam when entering said optical fiber sensing loop means, according to a first frequency;

detection means, connected to said splitting means, for receiving at least portions of second and third light beams after exiting said optical fiber sensing loop means;

phase signal demodulation means, connected to said detection means, for receiving electrical signals representing second and third light beams as detected by said detection means, and for demodulating the electrical signals into phase signals that represent phase differences which exist between second and third light beams, according to the first frequency, wherein the phase differences between second and third light beams are indications of rotation of said optical fiber sensing loop means;

second modulation means, proximate to said light source means, for intensity modulating the first light beam according to a second frequency;

third modulation means, connected to said optical fiber sensing loop means, for intensity modulating the second light beam when entering said optical fiber sensing loop means;

intensity signal demodulation means, connected to said phase signal demodulation means, for demodulating signals from said phase signal demodulation means, according to the second frequency, wherein said intensity signal demodulation means outputs signals indicating intensity differences between second and third light beams; and optical power balancing servo electronic means, connected to said intensity signal demodulation means and to said third modulation means, for processing signals indicating intensity differences between second and third light beams and outputting optical balancing signals to said third modulation means to affect the intensity of the second light beam so as to null-out the intensity differences between the second and third light beams.

6. An interferometric fiber optic gyroscope comprising:

light source means for emitting a first light beam;

first modulation means, proximate to said light source means, for intensity modulating the first light beam according to a first frequency;

splitting means, connected to said first modulation means, for splitting a modulated first light beam into second and third light beams;

optical fiber sensing loop means, connected to said splitting means, wherein the second light beam propagates through said optical fiber sensing loop means in a first direction and the third light beam propagates in said optical fiber sensing loop means in a second direction, such that the second and third beams counter-rotate in said optical fiber sensing loop means;

second modulation means, connected to said optical fiber sensing loop means, for intensity modulating the second light beam when entering said optical fiber sensing loop means;

third modulation means, connected to said optical fiber sensing loop means, for phase modulating the third light beam when entering said optical fiber sensing loop means, according to a second frequency;

detection means, connected to said splitting means, for receiving at least portions of second and third light beams after exiting said optical fiber sensing loop means;

phase signal demodulation means, connected to said detection means, for receiving electrical signals representing second and third light beams as detected by said detection means, and for demodulating the electrical signals into phase signals that represent phase differences which exist between second and third light beams, according to the second frequency;

phase signal servo electronic means, connected to said phase signal demodulation means and to third modulation means, for receiving the phase signals and outputting phase modulation signals which go to said third modulation means, wherein the phase modulation signals have a sufficient magnitude to modulate the second light beam so as to bring the second light beam in phase with the third light beam, the amount of magnitude of the phase modulation signals being an indication of a rotation rate of said optical fiber sensing loop means;

intensity signal demodulation means, connected to said phase signal demodulation means, for demodulating phase signals from said phase signal demodulation means, according to the first frequency, wherein said intensity signal demodulation means outputs signals indicating intensity differences between second and third light beams; and optical power balancing servo electronic means, connected to said intensity signal demodulation means and to said second modulation means, for processing signals indicating intensity differences between second and third light beams and outputting optical balancing signals to said second modulation means to affect the intensity of the second light beam so as to null-out the intensity differences between the second and third light beams.

* * * * *